United States Patent [19]

Favagrossa

[11] Patent Number: 5,592,712

[45] Date of Patent: Jan. 14, 1997

[54] BRISTLE ROLLER FOR AUTOMATIC MOTOR VEHICLE WASHING SYSTEMS

[76] Inventor: Edoardo Favagrossa, Via Lepanto, 51, 26040 Roncadello Di Casalmaggiore, (Cremona), Italy

[21] Appl. No.: 620,704

[22] Filed: Mar. 21, 1996

Related U.S. Application Data

[63] Continuation of Ser. No. 225,549, Apr. 11, 1994, abandoned.

[30] Foreign Application Priority Data

Feb. 11, 1994 [IT] Italy .................. MI94A0256

[51] Int. Cl.$^6$ ................. A46B 9/00; B60S 3/04
[52] U.S. Cl. ............... 15/179; 15/207.2; 15/230; 15/532; 15/973; 15/DIG. 2
[58] Field of Search ............ 15/53.2, 53.3, 15/97.3, 179, 181, 183, 207.2, 230, 230.12, 230.14, 230.15, 230.16, 230.17, 230.18, 230.19, DIG. 2, 230.13

[56] References Cited

U.S. PATENT DOCUMENTS

| | | | |
|---|---|---|---|
| 981,841 | 1/1911 | Codman | 15/230.14 |
| 1,475,074 | 11/1923 | McLaughlin | 15/230 |
| 2,004,623 | 6/1935 | Yohe | 15/230 |
| 2,311,135 | 2/1943 | Steinmetz | 15/230.16 |
| 2,522,093 | 9/1950 | Churchill | 15/230.13 |
| 2,913,856 | 11/1959 | Carlton | 15/230.14 |
| 3,357,141 | 12/1967 | Annis, Jr. | 15/230.14 |
| 3,535,833 | 10/1970 | Belanger | 15/230.14 |
| 3,683,441 | 8/1972 | Fromme | 15/97.3 |
| 3,857,135 | 12/1974 | Takeuchi | 15/97.3 |
| 4,104,756 | 8/1978 | Gasser | 15/DIG. 2 |
| 4,165,778 | 8/1979 | Smith | 15/97.3 |
| 4,377,878 | 3/1983 | Pecora | 15/230.16 |
| 4,567,619 | 2/1986 | Clark | 15/97.3 |
| 4,646,380 | 3/1987 | Kobayashi | 15/230.16 |
| 4,653,135 | 3/1987 | Clark | 15/97.3 |
| 4,658,460 | 4/1987 | Edoardo | 15/DIG. 2 |
| 5,247,767 | 9/1993 | Hadgis | 15/230.14 |

FOREIGN PATENT DOCUMENTS

| | | | |
|---|---|---|---|
| 493451 | 6/1953 | Canada | 15/230.19 |
| 0271157 | 12/1986 | Japan | 15/230.16 |

*Primary Examiner*—David Scherbel
*Assistant Examiner*—Randall E. Chin
*Attorney, Agent, or Firm*—Bucknam and Archer; F. M. Fiordalisi

[57] ABSTRACT

The present invention relates to a bristle roller for automatic motor vehicle washing systems comprising a cylindrical body on the surface of which there are distributed a plurality of bristles. The main feature of the invention is that the bristles are made from strips of a thin layer of polypropylene, polythene, plastic materials and copolymers thereof.

3 Claims, 2 Drawing Sheets

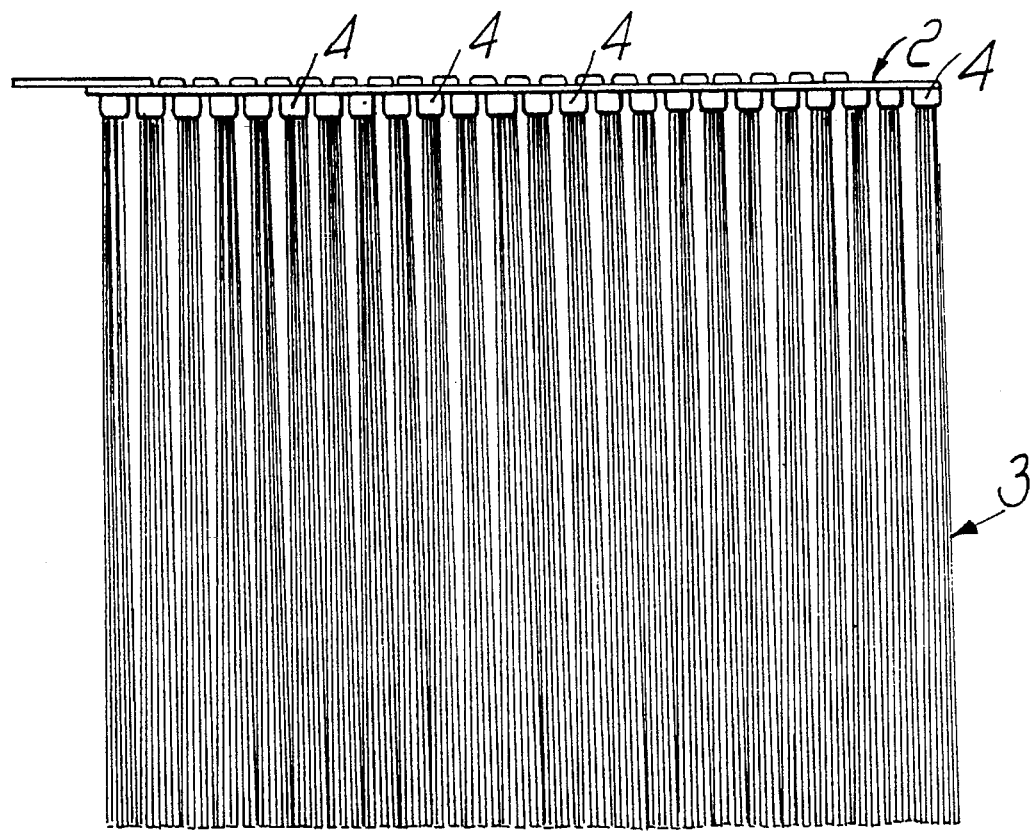
FIG. 2
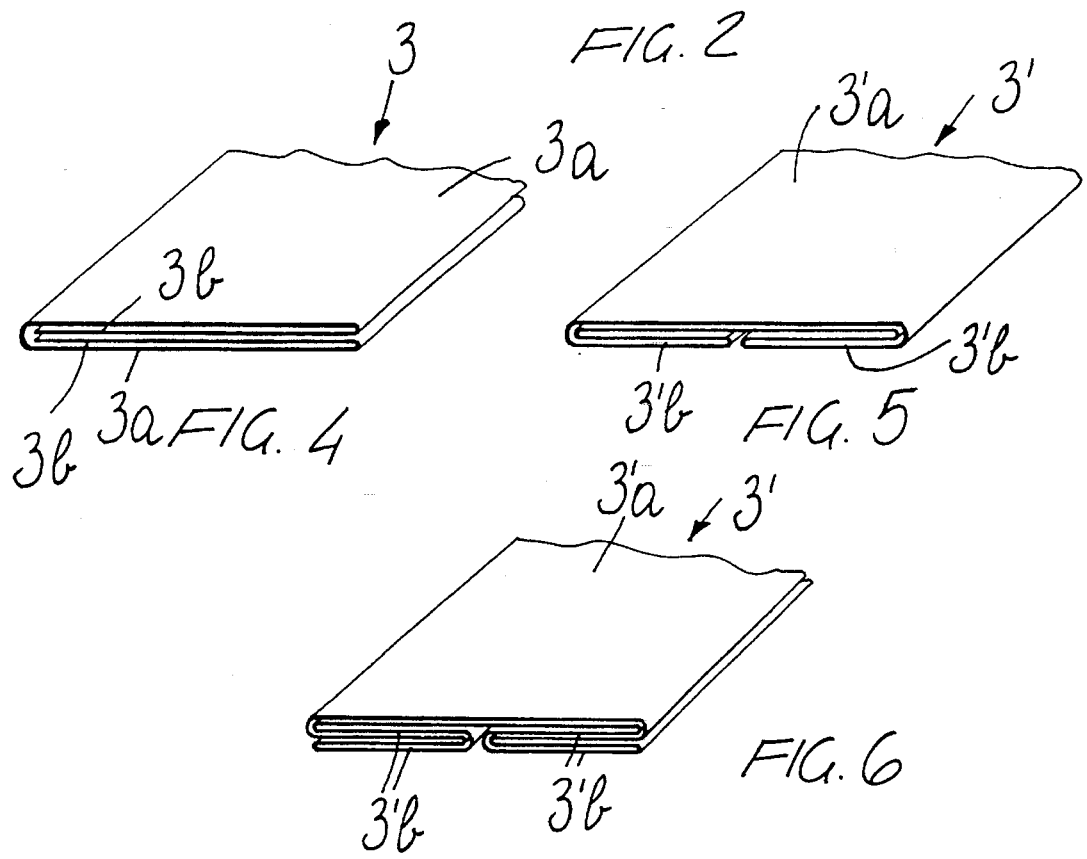
FIG. 4
FIG. 5
FIG. 6

5,592,712

BRISTLE ROLLER FOR AUTOMATIC MOTOR VEHICLE WASHING SYSTEMS

This is a Continuation of U.S. patent application Ser. No. 08/225,549 filed Apr. 11, 1994, now abandoned.

BACKGROUND OF THE INVENTION

The present invention relates to a bristle roller for automatic motor vehicle washing systems.

As is known, in automatic systems for washing motor vehicles and the like, presently used are rollers which have, on their outer cylindrical surface, a plurality of bristles made of yarns of polythene, which are caused to slidably contact the surface of the motor vehicle to be washed, so as to remove dirt therefrom.

From experimental tests, it has been found that in these rollers there occurs a micronized wear of the bristles because of the sliding contact of the bristles with the motor vehicle body, and this generates a very fine powder which is deposited on the motor vehicle body so as to form a powder film, the removal of which is very difficult.

This fact is particularly deleterious since, in addition to quickly wearing the bristles, it is susceptible to damaging the motor vehicle painted surface.

In this connection, it should be moreover pointed out that conventional bristles applied to conventional bristle rollers have a low strength.

The mentioned prior bristle rollers, moreover, are susceptible to be easily broken by the wedge-like profiles of sport motor vehicles or other motor vehicles having particular aerodynamic profiles.

Under these conditions, prior bristle rollers frequently damages the motor vehicles or are damaged thereby.

In fact, the prior filaments or bristles, because of their fine construction, penetrate frequently between parts of the motor vehicle body or plastic spoilers, or between the windshield wipers so as to remove and eject into the encompassing space all of the things entrapped by the bristles.

Under these conditions, frequently there are also broken the rear windows and mainly those which have not been mounted as series fittings, and which are usually provided with a steel stem, unless they are suitably bent so as to abut against the motor vehicle body.

On the contrary, the washing rollers made with the subject bristles, because of the greater consistency thereof, allow to overcome the above mentioned drawbacks.

SUMMARY OF THE INVENTION

The aim of the present invention is that of solving the above mentioned problems, by providing a washing roller including a new type of bristle which, in addition to preventing a micronization of the particles forming the bristles, also offsets the possibility of cleaning very efficiently the motor vehicles.

Within the scope of the above mentioned aim, a main object of the present invention is to provide such a washing roller the bristles of which have a greater surface so as to provide a broader and more delicate contact with the motor vehicle surface, thereby increasing the washing efficiency without damaging the body painted surface.

Another object of the present invention is to provide such a washing roller which is very reliable and safe in operation and which can be easily made starting from easily available elements and materials and which, moreover, is very advantageous from a mere economic standpoint.

According to one aspect of the present invention, the above mentioned aim and objects, as well as yet other objects, which will become more apparent hereinafter, are achieved by a bristle roller for automatic motor vehicle washing systems, comprising a cylindrical body on the surface of which there are distributed a plurality of bristles, characterized in that said bristles are constituted by strips of a thin layer of polypropylene, polythene, copolymers or other plastics material.

Thus, the bristle strips, because of their configuration, will provide a more delicate washing action, preventing the bristles from being micronized and preventing particles thereof from being deposited on the painted surface.

Moreover, there are eliminated possible scratches to the painted surface as those which are caused by dirt accumulated on the motor vehicle body.

BRIEF DESCRIPTION OF THE DRAWINGS

Further characteristics and advantages of the invention will become more apparent hereinafter from the following detailed disclosure of a preferred, though not exclusive, embodiment of the bristle rollers, for motor vehicle automatic washing systems, which is illustrated, by way of an indicative, but not limitative example, in the accompanying drawings, where:

FIG. 2 illustrates the supporting element for supporting the bristles, as applied to the roller or cylinder;

FIG. 4 illustrates, on an enlarged scale, the cross-section of a bristle made of a strip of plastic material, and in a bent and flattened condition;

FIG. 5 illustrates, on an enlarged scale, the cross-section of the bristle, made of a tubular strip of a plastic material, also in a flattened condition;

FIG. 6 illustrates, by way of an example, a further variation of the flattened and bent bristles according to the invention.

DESCRIPTION OF THE PREFERRED EMBODIMENT

Figure 1:
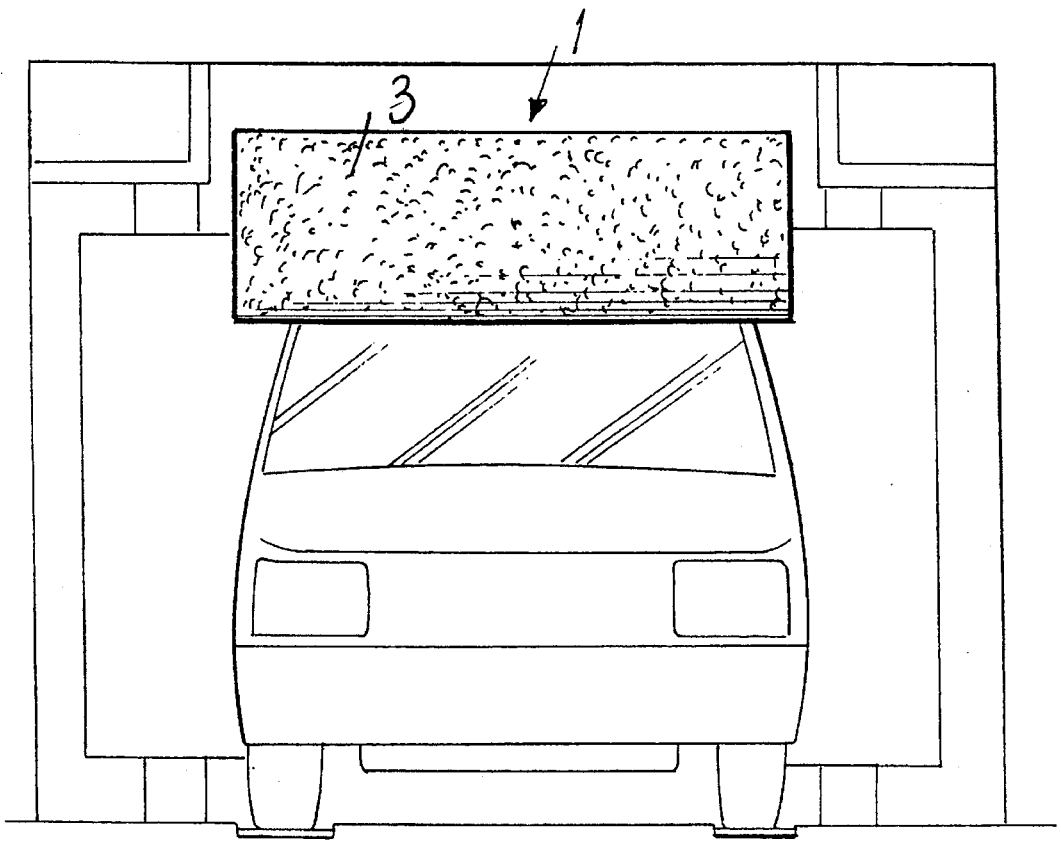
FIG. 1 is a schematic view illustrating a bristle roller applied to a washing system.
Figure 3:
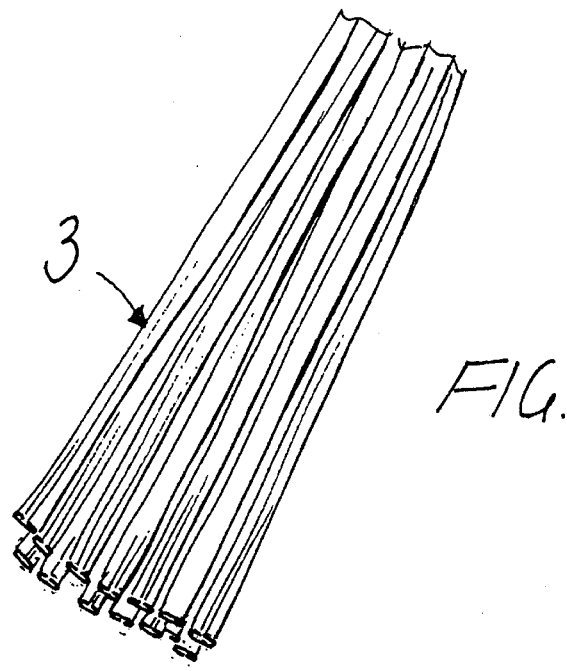
FIG. 3 illustrates a bristle assembly.

With reference to the number references of the figures of the accompanying drawings, the bristle roller, for automatic motor vehicle washing systems, according to the invention, which has been generally indicated by the reference number 1, comprises a cylindrical body which thereon are applied the rod-like elements 2 which support a plurality of strip-like bristles, indicated with the reference number 3.

Advantageously, the bristles 3 are collected in assemblies, which extend from adjoining holding seats 4, provided on the element 2.

The main feature of the invention is that the bristles are made of strips 3, obtained from a thin layer of polypropylene, polythene or plastic materials or polymers thereof, which preferably comprise burrs having a longitudinal configuration, arranged according to the longitudinal extension of the bristles.

In order to increase the force exerted during the washing operation, the polypropylene, polythene or other plastic materials or polymers strips are bent as is shown in FIG. 4, so that each bristle includes an outer body 3*a* having a flat configuration, which is connected to longitudinal portions, also of flat configuration 3*b,* which are inwardly bent.

As shown in FIG. 5, the bristles, indicated at the reference number 3', also have a flat configuration, with the difference that they are obtained from a polypropylene, polythene or other plastic material and copolymer flattened tubular element which is bent so as to have an outer configuration, indicated at 3'*a,* of flattened shape, which connects with longitudinal portions, indicated at 3'*b,* which are bent for one or more times, according to angles of approximately 180°. FIGS. 5 and 6 show a separating longitudinal gap between the bent portions.

With the disclosed arrangement, accordingly, there are obtained bristles adapted to provide a very efficient washing operation, without any loss of the bristle material susceptibile to be deposited on the surface being washed.

From the above disclosure it should be apparent that the invention fully achieves the intended objects.

In particular, the fact is to be pointed out that the new bristle type according to the invention allows to provide a very good cleaning or washing of the motor vehicle body, both because of the greater washing surface of the bristles and because of the greater facility with which the dirt is discharged through the bristles.

The invention as disclosed is susceptible to several modifications and variations all of which will come within the scope of the inventive idea.

Moreover, all of the deatils can be replaced by other technically equivalent elements.

In practicing the invention, the used materials, provided that they are conceptually analogous to the above indicated materials, can be any, according to requirements.

I claim:

1. A bristle roller for motor vehicle automatic washing systems, comprising a cylindrical body rotatively supported for rotating about a substantially horizontal axis, said cylindrical body supporting a plurality of rod-like elements, each said rod-like element having a plurality of adjoining seats, each said seat having a respective plurality of elongated strip-like elements made of a plastic material selected from the group consisting of polypropylene, polythene and copolymers thereof, each said strip-like element being formed by folding the plastic material so as to define a longitudinal outer body of flat configuration with inwardly folded longitudinal edge flat portions.

2. A bristle roller according to claim 1, wherein said inwardly folded longitudinal edge flat portions are folded one time through a folding angle of substantially 180°.

3. A bristle roller according to claim 1, wherein said inwardly folded longitudinal edge flat portions are folded several times through a folding angle of substantially 180° so as to leave a separating longitudinal gap therebetween.

\* \* \* \* \*